(12) United States Patent
Waskin et al.

(10) Patent No.: US 11,995,607 B2
(45) Date of Patent: *May 28, 2024

(54) FRICTIONLESS RE-ORDERING AND RE-STOCKING

(71) Applicant: NCR Voyix Corporation, Atlanta, GA (US)

(72) Inventors: Marjorie Costillas Waskin, Leyte (PH); Virgilio Ayuban Esquilla, Jr., Bohol (PH); Charl Rio Villeno Lagura, Cebu (PH); Mary Laurice Bacanaya Sanchez, Cebu (PH)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,265

(22) Filed: Oct. 14, 2022

(65) Prior Publication Data

US 2023/0034499 A1 Feb. 2, 2023

Related U.S. Application Data

(63) Continuation of application No. 16/525,885, filed on Jul. 30, 2019, now Pat. No. 11,531,958.

(51) Int. Cl.
*G06Q 10/087* (2023.01)
*G06T 7/70* (2017.01)

(52) U.S. Cl.
CPC ............. *G06Q 10/087* (2013.01); *G06T 7/70* (2017.01); *G06T 2207/30242* (2013.01)

(58) Field of Classification Search
CPC ................... G06Q 10/087; G06T 7/70; G06T 2207/30242
See application file for complete search history.

(56) References Cited

U.S. PATENT DOCUMENTS 7,370,005 B1 * 5/2008 Ham .................. G06Q 30/0617
  705/28
7,848,953 B2 * 12/2010 Kahlon ................ G06Q 10/087
  705/28

(Continued)

OTHER PUBLICATIONS

Cidal, Gizem Melike, et al. "A study on the development of semi automated warehouse stock counting system." 2019 6th International Conference on Electrical and Electronics Engineering (Iceee). IEEE, 2019. (Year: 2019).*

*Primary Examiner* — Asfand M Sheikh
(74) *Attorney, Agent, or Firm* — Schwegman Lundberg & Woessner, P.A.

(57) ABSTRACT

Images capture locations of items on store shelves or on store display areas. An item inventory is automatically maintained from the images. Re-stocking rules for each item type are processed and a specific item type is automatically ordered from a vendor when dictated by a corresponding rule. A delivery of the specific items ordered is tracked within the store from the images for re-stocking the specific items within the store during the delivery by a vendor representative. The specific item delivery and restocking are verified, and an automatic acceptance of the specific items is sent to the vendor associated with the delivery when verified. In an embodiment, store personnel (admin, manager, owner) are automatically notified with a successful restocking. In an embodiment, payment is automatically made to the supplier when store personnel confirms the delivery.

18 Claims, 4 Drawing Sheets

(56) References Cited

U.S. PATENT DOCUMENTS

| | | | |
|---|---|---|---|
| 9,922,513 B1* | 3/2018 | Hall | G07C 9/00896 |
| 9,996,819 B1* | 6/2018 | Modi | G10L 15/22 |
| 10,552,933 B1* | 2/2020 | Calhoon | G06V 20/10 |
| 11,087,273 B1* | 8/2021 | Bergamo | G06Q 10/087 |
| 2002/0091590 A1* | 7/2002 | Edgar | G06Q 30/06 |
| | | | 705/28 |
| 2003/0040980 A1* | 2/2003 | Nakajima | G07F 17/13 |
| | | | 705/26.8 |
| 2003/0083963 A1* | 5/2003 | Benson | G06Q 10/0875 |
| | | | 705/28 |
| 2003/0088442 A1* | 5/2003 | Michael | G06Q 20/203 |
| | | | 705/22 |
| 2003/0105722 A1* | 6/2003 | Welt | G06Q 40/00 |
| | | | 705/64 |
| 2003/0212602 A1* | 11/2003 | Schaller | G06Q 20/203 |
| | | | 705/28 |
| 2007/0162182 A1* | 7/2007 | Marti | G07F 9/026 |
| | | | 221/6 |
| 2007/0193834 A1* | 8/2007 | Pai | G06Q 10/08 |
| | | | 186/3 |
| 2010/0138037 A1* | 6/2010 | Adelberg | G07F 9/001 |
| | | | 700/241 |
| 2013/0118094 A1* | 5/2013 | Laspia | E04H 1/00 |
| | | | 52/79.1 |
| 2013/0182114 A1* | 7/2013 | Zhang | H04N 7/181 |
| | | | 348/150 |
| 2015/0178654 A1* | 6/2015 | Glasgow | G06Q 10/0875 |
| | | | 705/7.25 |
| 2016/0371540 A1* | 12/2016 | Pabbichetty | G06V 40/172 |
| 2017/0236188 A1* | 8/2017 | Puck | G06Q 30/0635 |
| | | | 705/26.81 |
| 2017/0300641 A1* | 10/2017 | Qerim | G16H 40/63 |
| 2017/0337508 A1* | 11/2017 | Bogolea | G05D 1/0282 |
| 2018/0060804 A1* | 3/2018 | Cheruku | G06Q 20/203 |
| 2018/0158265 A1* | 6/2018 | Lyman | G07C 9/20 |
| 2018/0253682 A1* | 9/2018 | Gilman | G06Q 20/28 |
| 2018/0285354 A1* | 10/2018 | Minami | G06V 20/64 |
| 2018/0293543 A1* | 10/2018 | Tiwari | G05D 1/0274 |
| 2018/0322448 A1* | 11/2018 | Nemati | G06Q 10/087 |
| 2019/0043002 A1* | 2/2019 | King | G07C 9/00174 |
| 2019/0080281 A1* | 3/2019 | Tingler | G06Q 10/087 |
| 2019/0149725 A1* | 5/2019 | Adato | H04N 1/00 |
| | | | 348/158 |
| 2019/0213533 A1* | 7/2019 | Green | G07F 9/001 |
| 2019/0370738 A1* | 12/2019 | Medina | H04W 4/35 |
| 2020/0228753 A1* | 7/2020 | Ortiz Egea | H04N 5/33 |
| 2021/0097478 A1* | 4/2021 | Yang | G06V 20/20 |
| 2021/0216951 A1* | 7/2021 | Schumacher | H04N 23/57 |

* cited by examiner

FRICTIONLESS RE-ORDERING AND RE-STOCKING

CROSS-REFERENCE TO RELATED APPLICATION

This application is a continuation of U.S. patent application Ser. No. 16/525,885, filed Jul. 30, 2019, which application and publication is incorporated herein by reference in its entirety.

BACKGROUND

Recent advancements in image processing has permitted retailers to provide a frictionless shopping experience to its consumers. In a frictionless store, an individual can check in with a store electronically, browse for items to purchase, place items in bags/carts, and exit the store without any interaction with a store agent or with a checkout station. The items that the individual possesses when leaving the store are recognized through image processing and an account associated with the individual is automatically charged for the price of the items. This allows for quick and easy shopping and is referred to as a frictionless store or frictionless shopping because the consumer does not have to interact with any agent of the store or any terminal of the store to purchase items.

However, the industry has been unable to provide a true frictionless experience to the consumers because there are a variety of situations that still require interaction with staff of the store.

On such situation, is inventory management and re-ordering of stocked goods. Typically, restocking is based on an onsite inventory management system combined with a manager's physical inspection of the store shelves. Moreover, when the items are delivered from the supplier, a manager typically must be there to verify the proper number of items are being received and that the items are of the proper type/quality. Generally, the supplier also requires the manager to sign a document as well verifying that the manager agrees that the proper items were delivered for the order that was placed by the store. All of this requires people to physically inspect the store and to physically be present at the time of item delivery for restocking, which means a true frictionless store is still an elusive goal.

Thus, there is a need for frictionless re-ordering and frictionless re-stocking.

SUMMARY

In various embodiments, methods and a system for frictionless re-order and re-stock processing are presented.

According to an embodiment, a method for frictionless re-order and re-stock processing is presented. Item inventory is tracked from images of item areas. A determination is made based on a rule that a specific item is to be ordered to maintain a desired quantity of the specific item. An amount of the specific item is automatically ordered from a vendor system to achieve the desired quantity based on the determination. In an embodiment, the item inventory is tracked through item sales made versus available inventory.

DETAILED DESCRIPTION

Figure 1:
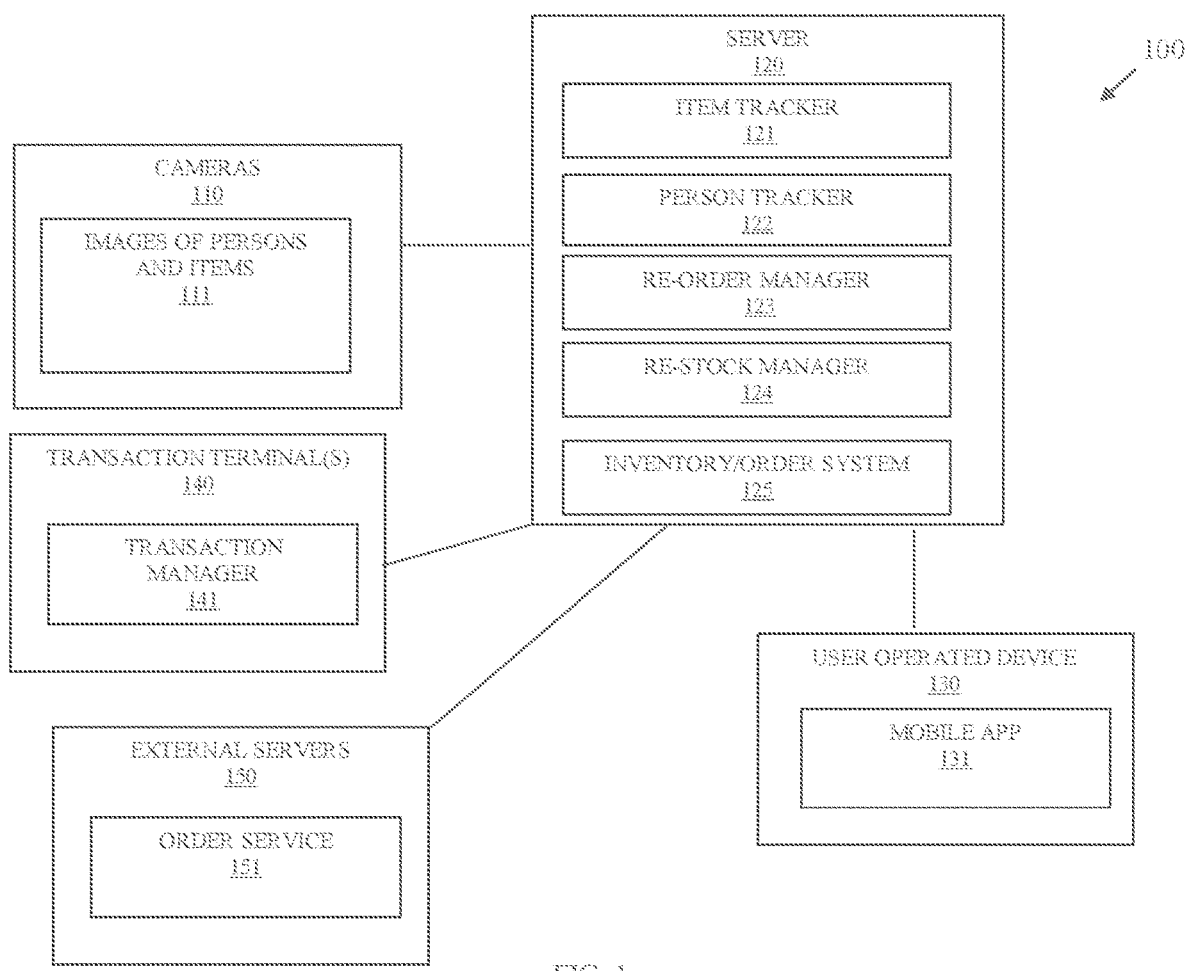
FIG. 1 is a diagram of a system for frictionless re-order and re-stock processing, according to an example embodiment.

FIG. 1 is a diagram of a system 100 for frictionless re-order and re-stock processing, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of frictionless re-order and re-stock processing, presented herein and below.

The system 100 includes a plurality of cameras 110 that capture images of persons and items (herein after just "defined area images 111"). The system also includes a server 120, a user-operated device 130 having a mobile application ("app") 131, one or transaction terminals 140 having a transaction manager 141, and one or more external servers 150 having order services 151. The server 120 includes executable instructions that execute on one or more hardware processors of the server 120 from a non-transitory computer-readable storage medium as: an item tracker 121, a person tracker 122, a re-order manager 123, a re-stock manager 124, and an inventory/order system 125. The user operated device 130 also includes a processor and non-transitory computer-readable media having executable instructions representing the mobile app 131. Similarly, the transaction terminal 140 includes a processor and non-transitory computer-readable storage media having executable instructions representing the transaction manager 141. Still further, the external servers 150 include processors and non-transitory computer-readable storage media having executable instructions representing the order servers 151.

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-125 may execute on a same server 120 or multiple different servers networked together.

The system 100 is implemented at a frictionless store. Initially, the cameras 110 are situated such that their field-of-views are directed to the shelves and displays having items that are being sold within the store. Other cameras may be directed capture images of store aisles, entry and exits of the store, checkout areas for Self-Service checkouts, entrance to restrooms, and the stocking room.

The cameras 110 are preconfigured to capture images 111 of the defined areas where items are located based on the field-of-view of the lenses of the cameras 110. Some of the cameras 110 may capture images 111 representing portions of a different area that a different one of the cameras 110 captures images 111 for. That is, each image 111 can include pixel values that overlap multiple ones of the defined areas.

Each camera lens configured to cover one or more predefined areas of the physical space of the frictionless store.

Furthermore, metadata is assigned to each camera 110 to include a unique camera identifier, a location identifier (representing the physical location that the camera 110 is situated within the enterprise, and one or more area identifiers (representing the predefined areas that the lens of the camera 110 captures in the images 111).

Each camera 110 provides time stamp and frame stamped images to the server 120. These images can be streamed over a wired or wireless connection between the cameras 110 and the server 120 to a commonly accessible storage area on the server 120 that is accessible to the item tracker 121 and the person tracker 122. In an embodiment, some of the images when streamed from the cameras 110 can be buffered or cached in memory of cache and made accessible from the memory or cache to the item tracker 121 and the person tracker 122.

Each accessible image 111 includes its metadata (minimally including what was discussed above) with its image 111 on the server 120.

The cameras 110 have their field-of-views directed to item shelving in accordance with a store planogram and/or directed to item displays that include items. Some of the cameras 110 are also directed to aisles of the store, entryways, exits, backroom storage, etc.

The item tracker 121 and the person tracker 122 are also preconfigured with a planogram for the frictionless store. The planogram provides each unique item type's location within the store including location within a shelf. The planogram provides a physical layout of the store and its items within that store. The planogram also includes the item identifiers for the items along with the store layout having the locations of each unique item type. The camera's identifier and predefined area identifier allows the item tracker 121 and the person tracker to assign each received image frame of the images 111 to a designated location within the store.

In an embodiment, the item tracker 121 may be able to dynamically identify items through image processing through matching with model pixel images associated with each item. In this way, the item tracker 121 may dynamically determine when items have been moved within the store and no longer comport with their predesignated locations included in the store's planogram.

The person tracker 122 processes the pixels of the images to identify a unique person (the actual identity of the person can be unknown, but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eye glasses (sun glasses), hats, eye color, etc. A bounding box is placed around the unique person with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In an embodiment, the person tracker 122 is configured with facial recognition to obtain an identity of a person being tracked from the images.

In an embodiment, the person tracker 122 is configured for facial recognition for a unique person present in the store but does not know an actual identity for the person. That is, the person may be unregistered but still uniquely tracked through unique facial attributes assigned to the unregistered person.

The identity of the person can be identified through registered facial features and or through a check-in process performed automatically or semi-automatically by the person. Such check-in processes can include the mobile app 131 reporting a location of the mobile device 130 that is identified as being the frictionless store; scanning a bar code upon entry of the frictionless store by the mobile device 130; carrying of store-issued key fob that transmits a wireless signal to a sensor upon entry of the person into the store; and others.

A person can be tracked by the person tracker 122 until an event or an image allows the person tracker 122 to assign an identity to a specific registered person of the store and matches that person to an activity expected at the store or matches that person to a registered customer or supplier account.

In a similar manner, the item tracker 121 identifies from the images 111 items that are residing on shelves and within item displays. The item tracker 121 may also identify items being handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) is unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc. Once enough confidence in the metadata is known for an unknown item, the item is identified and assigned item level details for a known item.

The item tracker 111 can also track the items that are stocked on shelves based on an image of the shelve having all the items or a defined portion of the items. Attributes for the type of item allows the item tracker 111 to count edges and corners associated with each unique item and total the items present in the image. The item tracker 111 may also be pre-configured with a known capacity of items on a designated shelf from the planogram.

As items are removed or placed on a given shelf, the item tracker 111 reports a new total for items of a given type to the re-order manager 123.

The re-order manager 123 receives continuously updated item totals per item type (item type include an item of a given brand and a given flavor or size for that brand). The re-order manager 123 may also interface with the inventory/order system 125 to receive current known totals available for sale by the store within the store. The inventory/order system 125 bases such totals off known ordered item inventory and known item sales processed by the transaction managers 141 of the transaction terminals 140.

Each item type may also be associated with item restocking rules. Such rules can be received from the inventory/order system 125 and/or through mobile app 131 of user-operated device 130 operated by a manager. In some cases, the manager can override existing restocking rules present in the inventor/order system 125 for a given item type through the mobile app 131.

The re-order manager 123 manages the item type restocking rules and maintains existing item type counts for specific items that are available within the store at any given point in time. Through the item tracker 121 the re-order manager 123 may become aware of a need for restocking a given item type before the inventor/order system 125 because several customers shopping within the store may delete a given item type from the item shelves or item displays while remaining in the store to buy other items. Moreover, the inventory/order system 125 typically only updates at predefined time frames which is typically no sooner than 1 business day and sometimes is longer. Thus, the re-order manager 123 is more up-to-date with item type totals and in some cases more accurate because item theft can be detected or is accounted for by the re-order manager 123 whereas such is only detected by the inventory/order system when manual inventory checks are performed that physically count each item type.

When a reorder item type rule is triggered by the re-order manager 123, the re-order manager 123 interacts with the inventory/order system 125 to obtain a list of suppliers/vendors associated with the item type that is being replenished. The list may be in a priority order defined by the inventory/order system 125 or provided by the manager through app 131 to the re-order manager 123.

The re-order manager 123 then sequentially uses Application Programming Interfaces (APIs) associated with each supplier and sends a message to each asking when the restocking request for the needed amount of a specific item type. When a given supplier cannot supply the needed item type of indicates that the needed item type cannot be supplied within a threshold number of days. The re-order manager 123 selects the next supplier on the priority list. This is done until an acceptable supplier that has the needed item in stock and can deliver the needed item within the threshold number of days is determined.

The re-order manager 123 then uses an API associated with the acceptable supplier and places an automatic order for the given item type with the order service 151 of that supplier.

The reorder manager 123 can be configured for automatically ordering of needed items as discussed above or can be configured to first receive manual verification from the manager via the user-operated device 130 and the mobile app 131. The automatic order can include sending a notification by the reorder manager 123 to the mobile app with the order details (including the selected supplier) along with a preset period of elapsed time that the reorder manager 123 waits to see if the manager is going to override or request a change in the order details (such as to add more of the items to be order or reduce the number of items being ordered). In some cases, the re-order manager 123 is configured to place the order automatically without any period of waiting and send the order details of a placed order to the mobile app 131 and/or the inventory/order system 125.

Another option is for the order to be manually verified with manager cancelation and/or modification with approval being required before the final order details are submitted by the re-order manager 123 to the supplier's order service 151. This interaction is achieved through the interface between the re-order manager 123 and the mobile app 131.

The manager can use the interface between mobile app 131 and the re-order manager 123 to custom define automatic ordering with no waiting period, automatic ordering with a waiting period, and manual verification order on each per item type of the item inventory for the store.

When a supplier confirms an order (order confirmation), the re-order manager 123 notifies the inventory/order system 125, the manager through mobile app 131, and any other administrative person that is required or configured to receive the order confirmation notification.

In an embodiment, the ordering between the appropriate order service and item ordering confirmation are performed by the inventory/ordering system 125. In this way, the re-order manager 123 acts as an intermediary to force the ordering of a given item and precipitate notification processing through the inventory/order system 125. However, the initial decision to order and the mechanism of ordering (automated with no waiting, automated with waiting, or manual verification) is performed by the re-order manager 123.

Once an order is placed, the re-stock manager 124 is triggered and provided the order confirmation and order details. The order confirmation details will include the name of the supplier, the specific item being ordered, the quantity of the items, a date (which may or may not include a time of day as well) for the scheduled delivery of the specific items, name of the delivery person, and/or employee number for the supplier of the delivery person.

The re-stock manager 124 may also be configured with image/pixel profiles for uniforms and/or specific delivery personnel for each supplier.

The person tracker 122 reports when the delivery person for the supplier has entered the store and assigns the pixels associated with images 111 of the delivery person to the re-stock manager 124. The re-stock manager then checks a schedule for the items being delivered at that date and time, acquires the appropriate order details (include item identifier, quantity of times, etc.) and may consult the item tracker 121 to verify the items in possession of the delivery person within the store. As the items are stocked at the expected location by the delivery person, the items are counted consulting the re-order manager 123. The item tracker 121 is asked to verify each item is of the proper type.

Assuming that everything is correct with the re-stocking, the re-stock manager 124 sends a confirmation that the items were as agreed to and were stocked properly within the store by the delivery person in the appropriate quantity. The confirmation is sent to the manager through app 131 and using the API to the supplier, the supplier then notifies a mobile device of the delivery person that the order was received, accepted, and confirmed by the store. The delivery person then exits the store. The inventory/order system 125 is also triggered, which may trigger automatic payment to the vendor for the delivered items in accordance with the original order details.

There are many variations that can occur, for example the actual identity of the delivery person can be authenticated through pre-registered facial recognition of the delivery person, through the delivery person displaying a name or identification badge to any of the cameras 111 or a camera of a transaction terminal 140, and/or scan a card at the transaction terminal 140.

In another variation, the delivery person may include a profile that is managed by the re-stock manager 124, the profile includes a mobile device number or an email, and the receipt of an accepted order delivery may be sent directly from the re-stock manager 124 to the delivery person.

In an embodiment, the re-stock manager 124 establishes a live video feed that streams the images (video) from the cameras of the delivery person upon entry into the store and provides the video directly to the mobile app 131. In this way, the manager can view in real time the re-stocking.

Once delivery of the re-stocked items is confirmed, the re-stock manager 124 may also notify the inventory/order system 125; again, this will trigger payment to the vendor on the terms associated with the original order and its order details.

The system 100 permits stores to decrease the size of back office inventory areas by performing re-ordering and re-stocking in an automated manner with no requirement of any personnel of the store being necessary. The manager of the store does not have to be physically present at the store to make re-ordering decisions and to receive re-stocking of items (in fact no store personnel need not be there). In this way the entire process is "frictionless" requiring no human-based management or intervention on the part of the store.

In an embodiment, the store is equipped with speakers through in-store terminals or situated throughout the store along with microphones. A voice-to-text and text-to-voice assistance system is deployed to provide the delivery person guidance as to where the restocking location is and how to restock the items. The voice guidance can be at the entrance of the store and at the shelf or item display where the restocking is to take place. In an embodiment, the delivery person has a mobile device with a customized mobile app, such that the voice guidance and interaction can occur on the device of the delivery person through that device's speakers and microphone.

In an embodiment, the store is not a frictionless store by a traditional store having the system 100 as a frictionless re-order and re-stock processing described above.

In an embodiment, the store is a combination traditional store with some aspects of or all areas of the store permitting frictionless store processing. So, some customers can use traditional store shopping while others can use frictionless shopping.

In an embodiment, the store is a frictionless store as discussed above.

In an embodiment, the store lacks completely or has a substantially smaller back-store item inventory storage space than a conventional store.

The delivery person is also tracked by the cameras 111 as existing in the store and will be detected if he/she takes any item from the store.

In an embodiment, the user-operated device 130 is one or more of: a phone, a tablet, a laptop, a desktop computer, a terminal (such as terminal 140), and a wearable processing device.

In an embodiment, the transaction terminal 140 is a Point-Of-Sale (POS) terminal or a Self-Service Terminal (SST).

These embodiments and other embodiments are now discussed with reference to the FIGS. 2-4.

Figure 2:
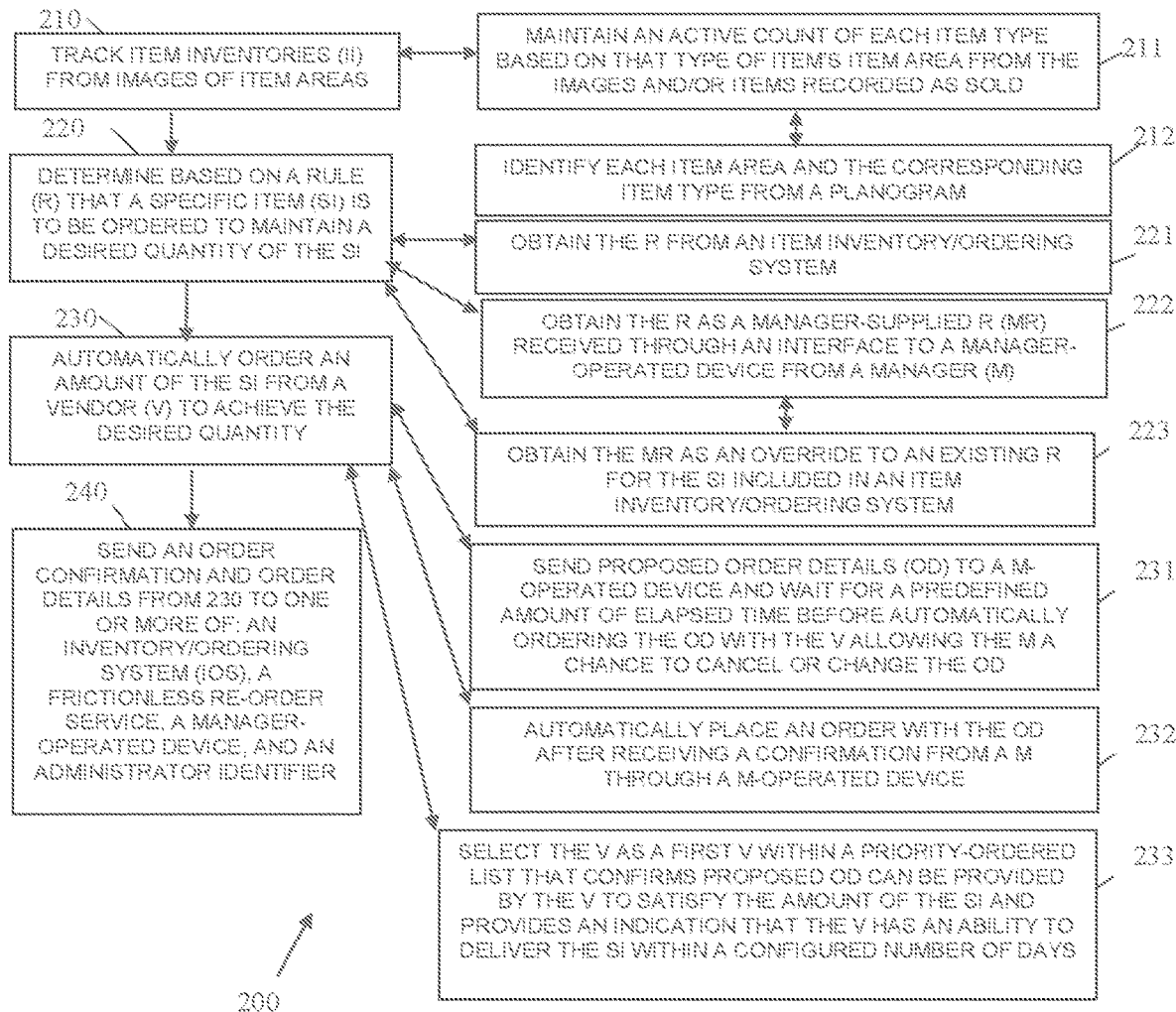
FIG. 2 is a diagram of a method for frictionless re-order and re-stock processing, according to an example embodiment.

FIG. 2 is a diagram of a method 200 for frictionless re-order and re-stock processing, according to an example embodiment. The software module(s) that implements the method 200 is referred to as a "frictionless re-order manager." The frictionless re-order manager is implemented as executable instructions programmed and residing within memory and/or a non-transitory computer-readable (processor-readable) storage medium and executed by one or more processors of a device. The processor(s) of the device that executes the frictionless re-order manager are specifically configured and programmed to process the frictionless re-order manager. The frictionless re-order manager has access to one or more network connections during its processing. The network connections can be wired, wireless, or a combination of wired and wireless.

In an embodiment, the device that executes the frictionless re-order manager is the server 120. In an embodiment, the server 120 is a cloud-based server.

In an embodiment, the frictionless re-order manager is all or some combination of: the item tracker 121, the person tracker 122, the re-order manager 123, inventory/order system 125, and/or the re-stock manager 124.

At 210, the frictionless re-order manager tracks item inventories from images of item areas. The item areas may include specific shelves within a store, specific sets of shelves, and/or specific displays of the items not having any shelving.

In an embodiment, at 211, the frictionless re-order manager maintains an active count of each item type based on that type of item's item area from the images. In an embodiment, the frictionless re-order manager also interacts with the store server and keeps track of item inventories available in the inventory/order system 125 versus each item recorded as sold by the store server and the time each item was sold.

In an embodiment of 211 and at 212, the frictionless re-order manager identifies each item area and the corresponding item type from a planogram associated with the store.

At 220, the frictionless re-order manager determines based on a rule that a specific item is to be ordered to maintain a desired quantity of the specific item within the store for purchase by customers.

In an embodiment, at 221, the frictionless re-order manager obtains the rule from an item inventory/ordering system 125.

In an embodiment, at 222, the frictionless re-order manager obtains the rule as a manager-supplied rule received through an interface 131 to a manager-operated device 130 from a manager.

In an embodiment of 222 and at 223, the frictionless re-order manager obtains the manager-supplied rule as an override to an existing rule for the specific item that was included in an item inventor/ordering system 125.

At 230, the frictionless re-order manager automatically orders an amount of the specific item from a vendor to achieve the desired quantity. This can be done through an API with a vendor/supplier ordering service 151.

In an embodiment, at 231, the frictionless re-order manager sends proposed order details to a manager-operated device 130 and waits for a predefined amount of elapsed time before automatically ordering the order details with the vendor, allowing the manager a chance to cancel or change the order details.

In an embodiment, at 232, the frictionless re-order manager automatically place an order with the order details after receiving a confirmation from a manager through a manager-operated device 130.

In an embodiment, at 233, the frictionless re-order manager selects the vendor as a first vendor within a priority-ordered vendor list that confirms proposed order details can be provided by that first vendor to satisfy the amount of the specific item and an indication that the vendor has an ability to deliver the specific item within a configured number of days.

In an embodiment, at 240, the frictionless re-order manager sends an order confirmation and order details produced at 230 to one or more of: an inventory/ordering system 125, a frictionless re-order service 123, a manager-operated device 130, and an administrator identifier.

Figure 3:
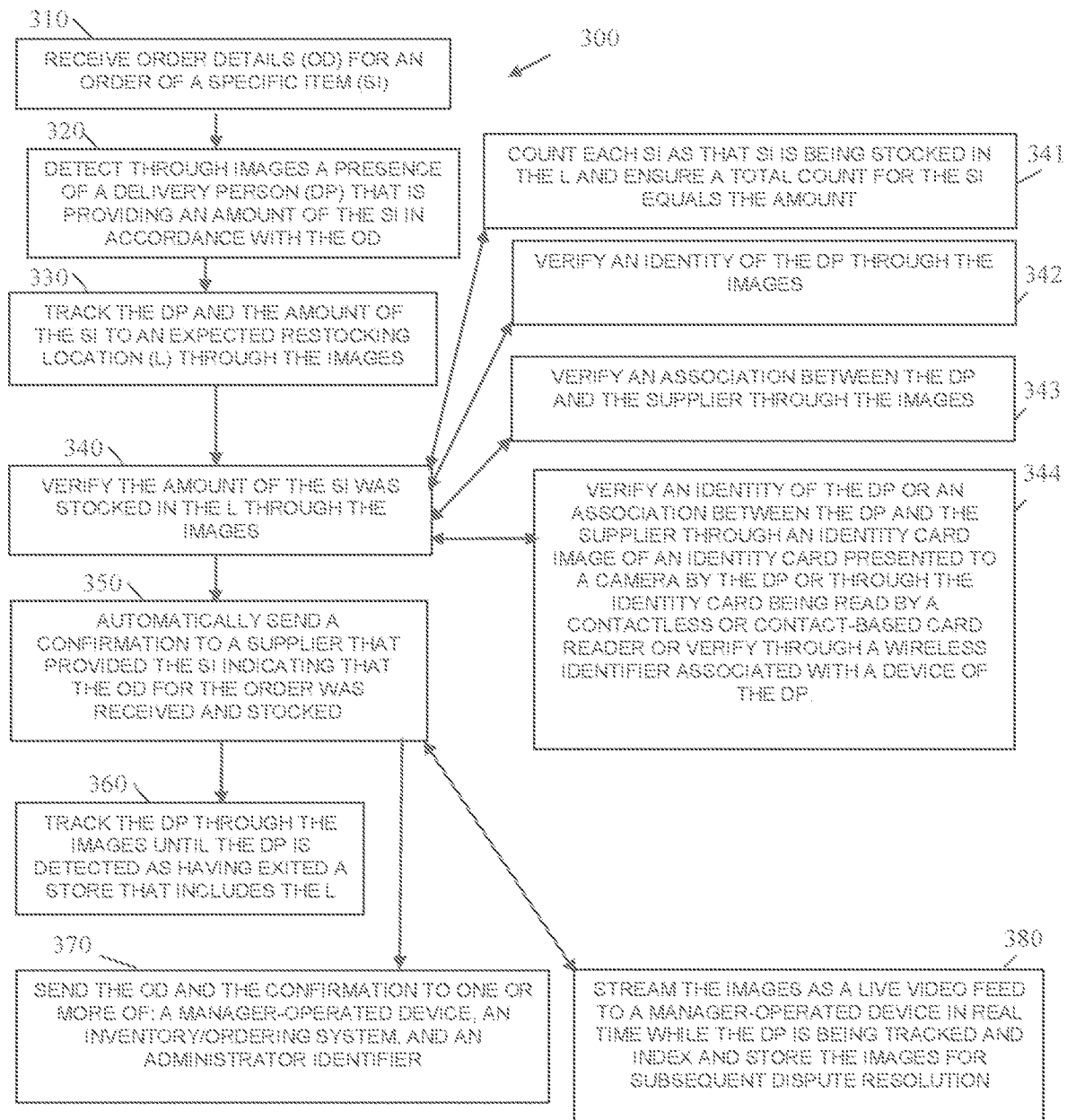
FIG. 3 is a diagram of another method for frictionless re-order and re-stock processing, according to an example embodiment.

FIG. 3 is a diagram of another method 300 for frictionless re-order and re-stock processing according to an example embodiment. The software module(s) that implements the method 300 is referred to as an "frictionless re-stock manager." The frictionless re-stock manager is implemented as executable instructions programmed and residing within memory and/or a non-transitory computer-readable (processor-readable) storage medium and executed by one or more processors of a device. The processors that execute the frictionless re-stock manager are specifically configured and programmed to process the frictionless re-stock manager. The frictionless re-stock manager has access to one or more network connections during its processing. The network connections can be wired, wireless, or a combination of wired and wireless.

In an embodiment, the device that executes the frictionless re-stock manager is the server 120. In an embodiment, the server 120 is a cloud processing environment.

In an embodiment, the frictionless re-stock manager is all of or some combination of: the item tracker 121, the person tracker 122, the re-order manager 123, the inventory/order system 125, the re-stock manager 124, and/or the method 200.

The frictionless re-stock manager presents another and, in some ways, enhanced processing perspective of the method 200 discussed above. That is whereas method 200 focused primarily on frictionless ordering, the processing of the frictionless re-stock manager focused more heavily on frictionless re-stocking.

At 310, the frictionless re-stock manager receives order details for an order of a specific item.

At 320, the frictionless re-stock manager detects through images a presence of a delivery person that is providing an amount of the specific item in accordance with the order details.

At 330, the frictionless re-stock manager tracks the delivery person and the amount of the specific item to an expected restocking location through the images (restocking location is the item area for the specific item and can include a specific shelf, a set of shelves, and/or a specific display that does not include shelving).

At 340, the frictionless re-stock manager verifies the amount of the specific item was stocked in the expected restocking location through the images.

In an embodiment, at 341, the frictionless re-stock manager counts each specific item as that specific item is being stocked in the expected restocking location and ensures that a total count for the specific item equals the amount that was ordered with the order details.

In an embodiment, at 342, the frictionless re-stock manager verifies an identity of the delivery person through images. This can be achieved when the delivery person has registered facial biometric features registered and through the images to match to the features through facial recognition.

In an embodiment, at 343, the frictionless re-stock manager verifies an association between the delivery person and the supplier through the images. This can be done through a set of image attributes associated with a uniform of the delivery person or names and logos present on packaging or equipment carried by the delivery person.

In an embodiment, at 344, the frictionless re-stock manager verifies an identify of the delivery person or an association between the delivery person and the supplier through an identity card image of an identity card presented to a camera by the delivery person or through the identity card being read by a contactless card reader or a contact-based card reader.

At 350, the frictionless re-stock manager automatically sends a confirmation to a supplier that provided the specific items indicating that the order details for the order was received by the store and stocked in the appropriate expected restocking area.

In an embodiment, at 360, the frictionless re-stock manager tracks the delivery person through images until the delivery person is detected as having exited a store that includes or is associated with the expected restocking location and the frictionless re-stock manager.

In an embodiment, at 370, the frictionless re-stock manager sends the order details and the confirmation of receipt and restocking to one or more of: a manager-operated device 130, an inventory/ordering system 125, and/or an administrator identifier associated with an administrator of the store.

In an embodiment, at 380, the frictionless re-stock manager streams the images as a live video feed to a manager-operated device 130 in real time while the delivery person is being tracked.

Figure 4:
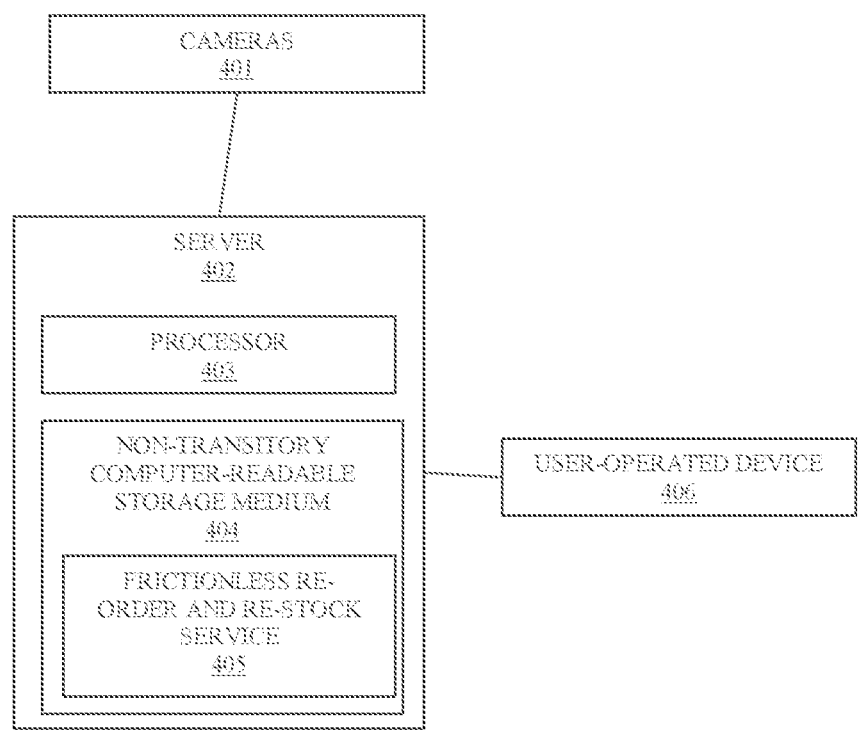
FIG. 4 is a diagram of a system for frictionless re-order and re-stock processing, according to an example embodiment.

FIG. 4 is a diagram of a system 400 for frictionless re-order and re-stock processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality of cameras 401, a server 402, and a user-operated device 406. The server 402 includes at least one hardware processor 403 and configured to execute executable instructions from a non-transitory computer-readable storage medium 404 as a frictionless re-order and re-stock service 405.

The frictionless re-order and re-stock service 405 when executed from the non-transitory computer-readable storage medium 404 on the processor 403 is configured to cause the processor to: 1) track item areas having items through images captured by the cameras 401; 2) maintain a count for each item in that item's corresponding item area; 3) evaluate rules for each item to determine when a particular count warrants a re-ordering with a supplier; 4) automatically place an order with the supplier based a particular rule when the particular count warrants the re-ordering; 5) track a delivery person within the store when the order is delivered to the store from the supplier through the images; 6) verify a particular item associated with the order is stocked in the store in the corresponding item area and includes a correct item amount that conforms to the order through the images; and 6) send an acceptance confirmation to the supplier when the particular item in the correct item amount is stocked by the delivery person in the corresponding item area.

In embodiment, the frictionless re-order and re-stock service 405 when executed by the processor 403 from the non-transitory computer-readable storage medium 404 further causes the processor 403 to: 7) send real-time notifications and a real-time video feed of the images having the delivery person to a user-operated device 406.

In an embodiment, the frictionless re-order and re-stock service 405 is all or some combination of the: image tracker 121, the person tracker 122, the re-order manager 123, the re-stock manager 124, the method 200, and/or the method 300.

In an embodiment, the server 402 is a cloud-based processing environment.

In an embodiment, the server 402 is a Local Area Network (LAN) server of a store having an Internet connection for interaction with suppliers and the store manager through a mobile application.

In an embodiment, the user-operated device 406 is: a mobile phone, a tablet, a desktop computer, a POS terminal, a SST, or a wearable processing device (such as a smart watch).

In an embodiment, the system 400 is deployed as a portion of a frictionless store implementation where customers (individuals) shop through computer-vision and image processing and items and individuals are associated with one another with a shopping cart maintained for each individual. Each individual can checkout and pay for his/her shopping cart items using any of the above-referenced techniques discussed with the FIG. 1. The frictionless store may be associated with or included within a traditional store as discussed above. That is, a traditional store can be equipped with the system 400 in all or a portion of the traditional store that includes POS terminals and SSTs as transaction terminals 140.

In an embodiment, the system 400 is deployed in a traditional and non-frictionless store to provide frictionless re-ordering and frictionless re-stocking in the manners discussed herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   obtaining, by a processor, a planogram for a store, wherein the planogram identifies item areas for items on shelves of the store;
   obtaining, by the processor, images captured of the item areas by cameras situated throughout the store;
   obtaining, by the processor, metadata for each image that identifies a specific area of the store that a specific camera captures in the corresponding image, a physical location of the specific camera within the store, and a specific area identifier for a predefined area that a lens of the specific camera captures in the corresponding image;
   determining, by the processor, a total count of each item on the shelves using the item areas, the specific areas, and the images and corresponding metadata of the images; and
   ordering, by the processor, an amount of a certain item from a vendor system based on the total count for the certain item and a desired quantity associated with the certain item and calculating the amount of the certain item by subtracting the total count from the desired quantity, wherein ordering further includes using an application programming interface (API) and automatically ordering the amount of the certain item from the vendor system.

2. The method of claim 1 further comprising:
   identifying, by the processor, a specific item from at least one image that is located on a given shelf that does not comport with the planogram; and
   reporting, by the processor, the specific item, the given shelf, and a correct shelf identified from the planogram for the specific item.

3. The method of claim 1 further comprising:
   maintaining, by the processor, an up-to-date and current total item count for each item of the store.

4. The method of claim 3, wherein maintaining further includes tracking specific items in possession of customers within the store from the images until the specific items are purchased by the customers or placed in locations within the store by the customers.

5. The method of claim 4, wherein tracking further includes maintaining a list of the specific items that were placed in the locations and reporting the list.

6. The method of claim 1 further comprising:
   tracking, by the processor, an individual from the images present within the store that restocks a given item on a given shelf of the store; and
   updating, by the processor, the total count for the given item using the images when the individual is no longer present within the images at the given shelf.

7. The method of claim 1 further comprising:
   continuously reporting, by the processor, the total count of each item to an inventory system associated with the store.

8. The method of claim 1, wherein ordering further includes processing rules associated with reordering each item along with the corresponding desired quantity for determining when to order the corresponding item with the corresponding vendor system.

9. The method of claim 1, wherein ordering further includes identifying the vendor system for the certain item based on an item type for the certain item and a vendor list for available vendor systems by item type.

10. The method of claim 9, wherein ordering further includes using the vendor list to select the vendor system for certain item when an initial selected vendor system for the certain item is unable to supply the certain item within a predefined amount of time.

11. The method of claim 1, wherein ordering further includes requesting a confirmation for a given order associated with the certain item from a management application of a mobile device operated by a manager of the store before placing the given order for the certain item with the vendor system.

12. A method, comprising:
maintaining, by a processor, a total count of each item on a given shelf of a store by using images, metadata associated with the images, and a planogram for locations of the items on the shelves, wherein the metadata identifies a physical location of a specific camera within the store providing a corresponding image, and a specific area identifier for a predefined area that a lens of the specific camera captures in the corresponding image;
identifying, by the processor, order details of an order placed by an order system of the store for a certain amount of a certain item;
detecting, by the processor, a delivery person from the images located at a certain shelf associated with the certain item using the metadata;
updating, by the processor, the total count for the certain item from the images when the delivery person is no longer located at the certain shelf;
comparing, by the processor, a previous total count for the certain item and a current total count for the certain item to determine a restocked amount of the certain item by subtracting the previous total count from the current total count to identify the restocked amount; and
sending, by the processor, a message to a supplier system indicating the restocked amount and the order details of the order, wherein sending further includes automatically sending the restocked amount and the order details of the order to the supplier system via an application programming interface.

13. The method of claim 12 further comprising:
sending, by the processor, a delivery message to a manager-operated device indicating the restocked amount and the order details of the order for the certain item.

14. The method of claim 12, wherein identifying the order details further includes obtaining identity information associated with the delivery person from the delivery details.

15. The method of claim 14, wherein detecting further includes obtaining from a certain image an identity card presented by the delivery person at the certain shelf during restocking and confirming the identity information from the identity card.

16. The method of claim 15, wherein obtaining further includes sending a second message to a management-operated device indicating the order details for the certain item and verification of the delivery person located in the store at the certain shelf.

17. The method of claim 12, wherein detecting further includes steaming a live feed of the corresponding images associated with delivery person located at the certain shelf to a management-operated device until the delivery person has left an area associated with the certain shelf.

18. The method of claim 12 further comprising, sending, by the processor, the total count for the certain item to an inventor system of the store.

* * * * *